No. 774,038. PATENTED NOV. 1, 1904.
G. CAGLE.
COTTON CHOPPER.
APPLICATION FILED APR. 15, 1904.
NO MODEL. 2 SHEETS—SHEET 1.
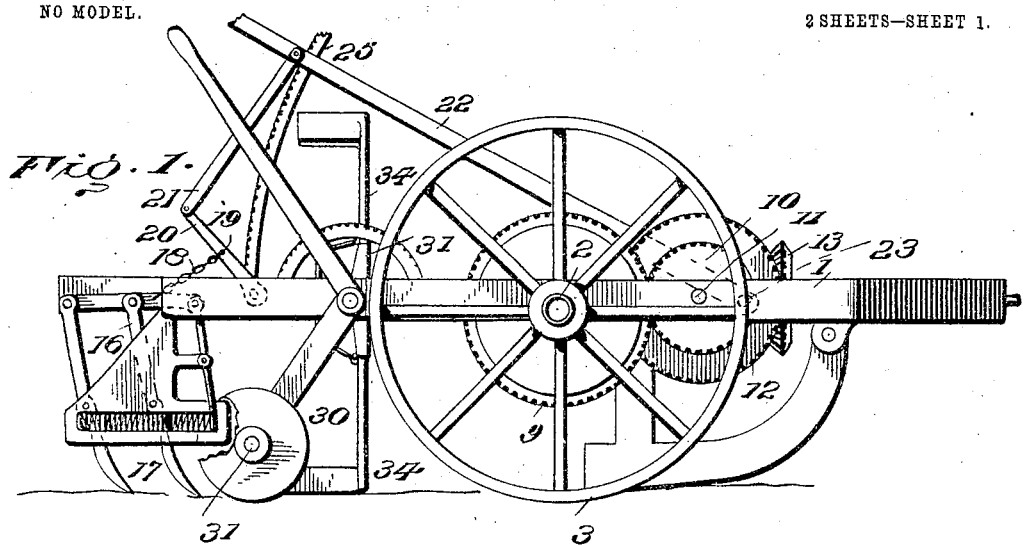
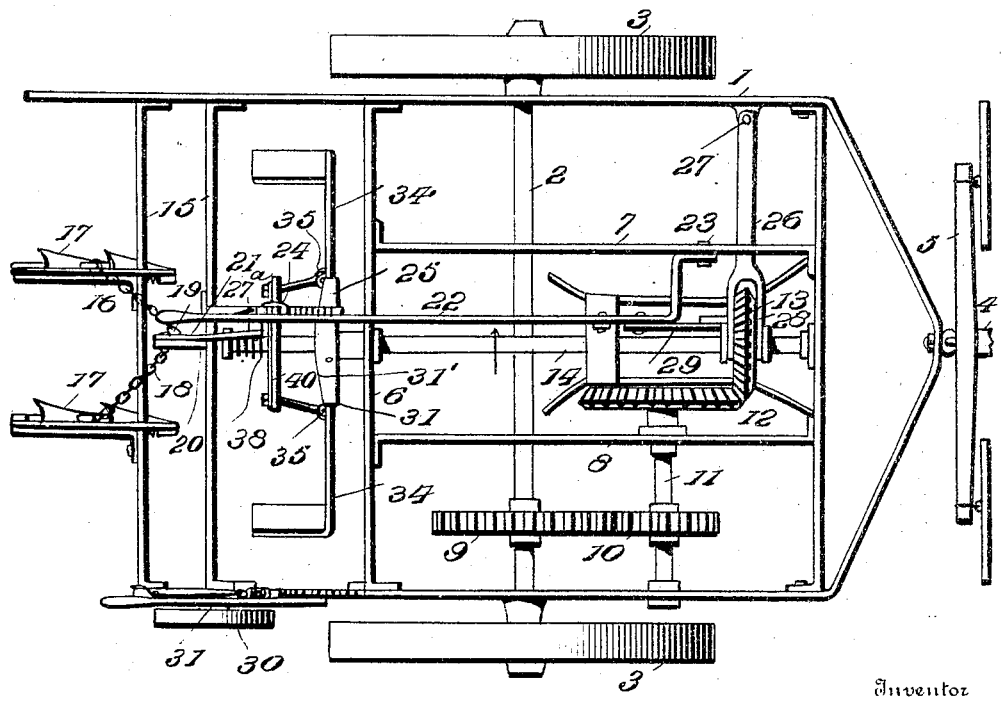
Witnesses
Inventor
Gaston Cagle,
By A. S. Pattison,
Attorney No. 774,038. PATENTED NOV. 1, 1904.
G. CAGLE.
COTTON CHOPPER.
APPLICATION FILED APR. 15, 1904.
NO MODEL. 2 SHEETS—SHEET 2.
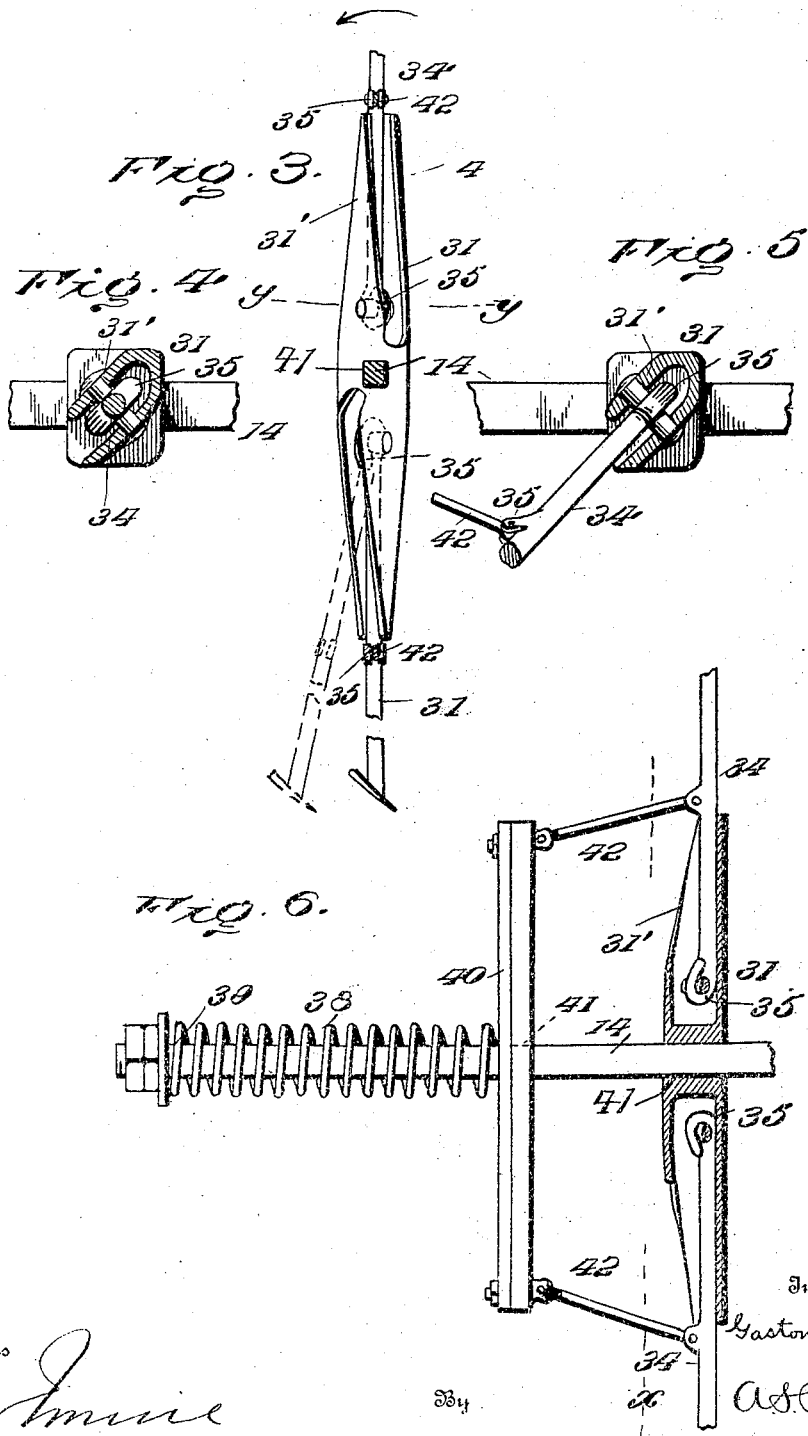

No. 774,038. Patented November 1, 1904.

UNITED STATES PATENT OFFICE.

GASTON CAGLE, OF WAGAR, ALABAMA.

COTTON-CHOPPER.

SPECIFICATION forming part of Letters Patent No. 774,038, dated November 1, 1904.

Application filed April 15, 1904. Serial No. 203,357. (No model.)

*To all whom it may concern:*

Be it known that I, GASTON CAGLE, a citizen of the United States, residing at Wagar, in the county of Washington and State of Alabama, have invented new and useful Improvements in Cotton-Choppers, of which the following is a specification.

My invention relates to improvements in cotton-choppers, and more particularly to that class in which a series of rotary cutters are mounted upon a single shaft.

The object of my invention is to provide a cotton-chopper which is mounted upon wheels and which is vertically adjustable, so that the choppers or cutters may be elevated above the ground for the purpose of transportation from place to place, and also providing means whereby the rotation of the same is stopped or started at will.

Another object of my invention is to provide spring choppers or cutters which are adapted to have a rearward and upward movement independent of the shaft when the same engages an obstacle—such as rocks, roots, or stumps—and thus preventing the said arms from being broken or otherwise injured.

In the accompanying drawings, Figure 1 is a side elevation of my improved chopper. Fig. 2 is a top plan view. Fig. 3 is an enlarged end view showing the blade-supporting member. Fig. 4 is a sectional view taken on line $y\ y$ of Fig. 3. Fig. 5 is a sectional view taken on the same line, but showing the blade forced rearward when the same has struck some obstruction. Fig. 6 is an enlarged plan view, partly in section, of the blade-supporting member and its spring connection.

Referring now to the drawings, 1 represents a frame which is preferably of an elongated form and which is provided with a transverse shaft 2 intermediate its ends, and mounted upon said shaft are the supporting-wheels 3, which are, as shown, on the outside of the frame. Secured to the forward end of the frame is a pole or tongue 4, carrying a doubletree 5, by means of which the same is drawn. The said frame adjacent its rear end is provided with a transverse bar 6, and connected to said bar and the forward end of the frame 1 are two parallel longitudinal bars 7 and 8.

The shaft 2 carries a gear-wheel 9, which meshes with a gear-wheel 10, which is carried by the shaft 11, which is rotatably mounted upon the side of the frame and the longitudinal bar 8, and said shaft at its inner end is provided with a beveled gear 12, which meshes with a beveled gear 13, which is carried by the shaft 14. The shaft 14 has its forward end mounted in the front end of the frame 1 and the rear end mounted in the transverse bar 6, the end thereof extending beyond the same. The gear 13 is movable upon the shaft 14, but held thereon against rotation, and thus by moving the gear thereon the same can be thrown in or out of mesh with the gear 12, and thus, as hereinafter more fully described, the choppers may be stopped or started at will.

The rear end of the frame 1 is provided with a transverse bar 15, to which are pivotally connected the downwardly-extending hoe-carrying members 16, which carry at their lower ends the hoes 17, which are adapted to enter the ground on each side of the row of cotton being thinned, and thus the same is cultivated as well as thinned. The said hoe-beams being pivotally supported by the bar 15, it will be clearly seen that the normal position of the same is in a downward position by the force of gravity, and thus the hoes are working. Secured to said beams intermediate their ends are chains 18, which extend upwardly and are connected to a ring 19, carried by the pivoted arm 20. The said arm 20 has its lower end pivotally connected with the transverse beam 15 and is connected at its upper end to a link 21, which is connected to the operating-lever 22. The said lever 22 is pivoted at its forward end 23 to the longitudinal beam 7. The rear end is provided with a loop 24, through which passes a segmental rack-bar 25, which is engaged by a spring-catch 21, which is adapted to hold the lever in its adjusted position.

The forward end of the frame 1 is provided with a transverse bar 26, which is pivoted to the side of the frame at 27 and has the opposite end bifurcated at 28 and adapted to straddle the gear-wheel 17, carried by the shaft 14. Connected to said bar 26 and to the lever 22 is a rod 29, and thus it will be seen that the raising of the lever 22 to elevate the cultivators will at the same time throw the arm 26 forward, thus moving the gear 13 out of mesh with the gear 12 and causing the chopper to stop rotating.

The rear end of the frame 1 is supported by a wheel 30, which is rotatably supported by a journal 31, which is supported or carried by the lower end of the L-shaped lever and said lever being pivotally supported by the frame, and thus by raising or lowering the lever the rear end of the frame is raised or lowered. By this structure it is readily seen that by raising or lowering the rear end of said frame the depth of the choppers will be changed, as hereinafter more fully described.

The shaft 14, as before described, has its forward end journaled in the frame 1 and the rear end passing through or journaled in the transverse bar 6 and extending a considerable distance therebeyond, and said extended end is squared beyond the bar 6. The said shaft, it will be understood, is rotatably mounted or supported, and rigidly supported by the shaft beyond the brace or bar 6 are the outwardly-extending guides or members 31. The said guides or members 31, as shown, are of a U-shaped form in cross-section, or, in other words, of an angular form, having the rear face open, the purpose of which will be hereinafter more fully described. The rear faces of said arms are slightly beveled, as shown at 31', from the center outwardly, for a purpose also hereinafter more fully described. Pivoted within each of said guides or members 31 adjacent their inner ends are the chopper-supporting arms 34. The said arms are preferably, as shown, made of a rounded piece of metal, and their inner ends are provided with eyes 35, which are of a considerable diameter, and passing through said eyes and carried by the guides or members 31 are rivets or pivots 31, and the width of the U-shaped angular guides 31 is considerably greater than the thickness of the arms 34. By this construction it will be seen that the arms 34 will have not only a swinging movement on the pivots, but will at the same time have a movement transverse the pivot, owing to the size of the eye and that of the pivot.

The extreme outer end of the shaft 14 carries a coil-spring 38, which has its outer end 39 passing through an opening in the end of the shaft 14, and the inner end of the spring bears against a plate 40, which is of an elongated form and has a central squared opening 41 to receive the squared end of the shaft 14, and thus the said plate 40 is held upon the shaft in a position at all times parallel with the guides 31, and the tendency of the spring 38 will be to force the said plate toward the arms. Pivotally connected to the outer ends of the plate 40 are the links 42, which have their opposite ends pivotally connected to the arms 34, and thus the tendency of the spring would be to normally hold the arms 34 within the U-shaped guides 31 during the ordinary operation of the machine. The outer ends of the arms 34 carry the choppers, which may be of any desired structure, but preferably of that shown in the drawings.

In the operation of my machine the shaft 14 travels in the direction indicated by arrow shown in Fig. 2, and should either of the choppers strike a stone or stump or any other obstacle the machine traveling forward the tendency would be to force the arm 34 out of the guides 31 against the tension of the spring, and the continued forward movement of the machine and the rotation of the shaft 14 would cause the arms 34 to engage the beveled portion 31' of the guides 31 and cause the same to move farther rearward and upward until the obstacle is passed, when the spring would cause the arm 34 to travel downward along the level 31' of the guides 31 and reseat itself therein, thus obviating any liability of the arms 34 being broken. The tension of the spring would be such as to overcome the resistance of the cutting or chopping action of the chopper, but would give under any extraordinary strain upon the choppers or arms.

Having thus described my invention, what I claim, and desire to secure by Letters Patent, is—

1. A cotton-chopper, comprising a frame, a rotary chopper-shaft mounted on said frame, and upwardly and rearwardly yielding choppers carried by said shaft.

2. A cotton-chopper comprising a frame, a rotary chopper-shaft mounted on said frame, guides carried by said shaft, and independently-yielding choppers carried by said guides.

3. A cotton-chopper comprising a frame, a rotatable shaft supported by said frame, upward rearwardly movable choppers carried by said shaft, and a spring for holding said choppers in their normal outward position.

4. A cotton-chopper, comprising a frame, a rotatable shaft supported by said frame, pivoted choppers carried by the shaft, and a coil-spring surrounding the shaft and bearing against said choppers for holding the same in their normal outward position.

5. A cotton-chopper, comprising a frame, a rotatable shaft supported by said frame, pivoted chopper-arms carried by the shaft, a slidable member carried by the shaft adjacent the chopper-arms, a coil-spring normally bearing against said member, and a link connection between said slidable member and the chopper-arms.

6. A cotton-chopper, comprising a frame, a rotatable shaft supported by said frame, outwardly-extending guides rigidly supported by said shaft, chopper-arms pivotally supported within said guide and means for holding said arms in said guides.

7. A cotton-chopper comprising a frame, a rotatable shaft supported by said frame, outwardly-extending guides rigidly supported by the shaft, chopper-arms pivotally supported within said guides and a spring for normally holding said arms within the guides.

8. A cotton-chopper comprising a frame, a rotatable shaft supported by said frame, outwardly-extending guides rigidly supported by the shaft, and having in their rear faces radially-extending recesses, chopper-arms pivoted within said recesses, and a spring surrounding the shaft and adapted to normally hold the arms in an outward position within the recesses.

9. A cotton-chopper comprising a frame, a rotatable shaft supported by said frame, outwardly-extending guides rigidly supported by the shaft and formed of a top and bottom plate having beveled rear edges, and a front wall, chopper-arms pivoted between said top and bottom walls, and having a rearwardly and upwardly swinging member over said beveled edges, and a coil-spring surrounding the shaft and normally holding the arms within said guides.

10. A cotton-chopper, comprising a frame, a rotatable shaft supported by said frame, pivotal choppers carried by the shaft, and a spring bearing against said choppers for holding the same in their normal outward position.

11. A cotton-chopper, comprising a frame, a rotatable shaft supported by said frame, outwardly-extending guides rigidly supported by the shaft, chopper-arms resting in said guides and having enlarged eyes in their inner ends and pivots passing through said guides and the eyes carrying chopper-arms.

12. A cotton-chopper, comprising a frame, a shaft rotatably mounted in said frame, means for driving said shaft at will and upward and rearwardly yielding choppers carried by said shaft.

13. A cotton-chopper, comprising a frame, a rotatable shaft supported by said frame, outwardly-extending guides rigidly supported by the shaft and formed of a top and bottom plate having beveled rear edges, and a front wall, chopper-arms pivoted between said top and bottom walls, a movable member surrounding the shaft, links connecting said member and the chopper-arms and a spring normally forcing said member forwardly toward the arms.

14. A cotton-chopper comprising a frame, a rotatable shaft supported thereby, outwardly-extending guides rigidly supported by the shaft, chopper-arms pivoted within said guides, a movable member surrounding the shaft, links connecting said member and the chopper-arms, and a spring surrounding the shaft normally forcing said member toward the guides, whereby the arms are normally held within said guides.

15. A cotton-chopper comprising a frame, a rotatable shaft supported by said frame, outwardly-extending guides rigidly supported by the shaft and formed of a top and bottom plate having beveled rear edges, and a front wall, chopper-arms pivoted between said top and bottom plates, a movable member surrounding the shaft, links connecting said member and the chopper-arm and a coil-spring surrounding the shaft in rear of said member and having its rear end secured to the shaft and its forward end bearing against said member.

16. A cotton-chopper, comprising a frame, a rotatable shaft supported by said frame, means carried by the forward end of the shaft for driving the same, means for raising and lowering the rear end of said shaft, outwardly-extending guides rigidly carried by the shaft adjacent its rear end, chopper-arms pivoted within said guides, a movable member loosely mounted upon the shaft but held against rotation, links connecting said member and chopper-arms, and a coil-spring surrounding the shaft and normally forcing said member toward the guides.

17. A cotton-chopper, comprising a frame, a rotatable shaft mounted in said frame, upward rearwardly movable choppers carried by said shaft, a spring for holding said choppers in their normal outward position, a beveled driven gear adjacent the said shaft, a slidable gear upon said shaft but held thereon against rotation, an arm pivoted to the frame and straddling the gear carried by the shaft, and carrying the same and means for moving said arm whereby the gear carried by the arm is moved in and out of engagement with the driven gear whereby the shaft is caused to rotate at will.

In testimony whereof I have hereunto set my hand in the presence of two subscribing witnesses.

GASTON CAGLE.

Witnesses:
W. P. LEWIS,
T. LEWIS.